Figure 1:
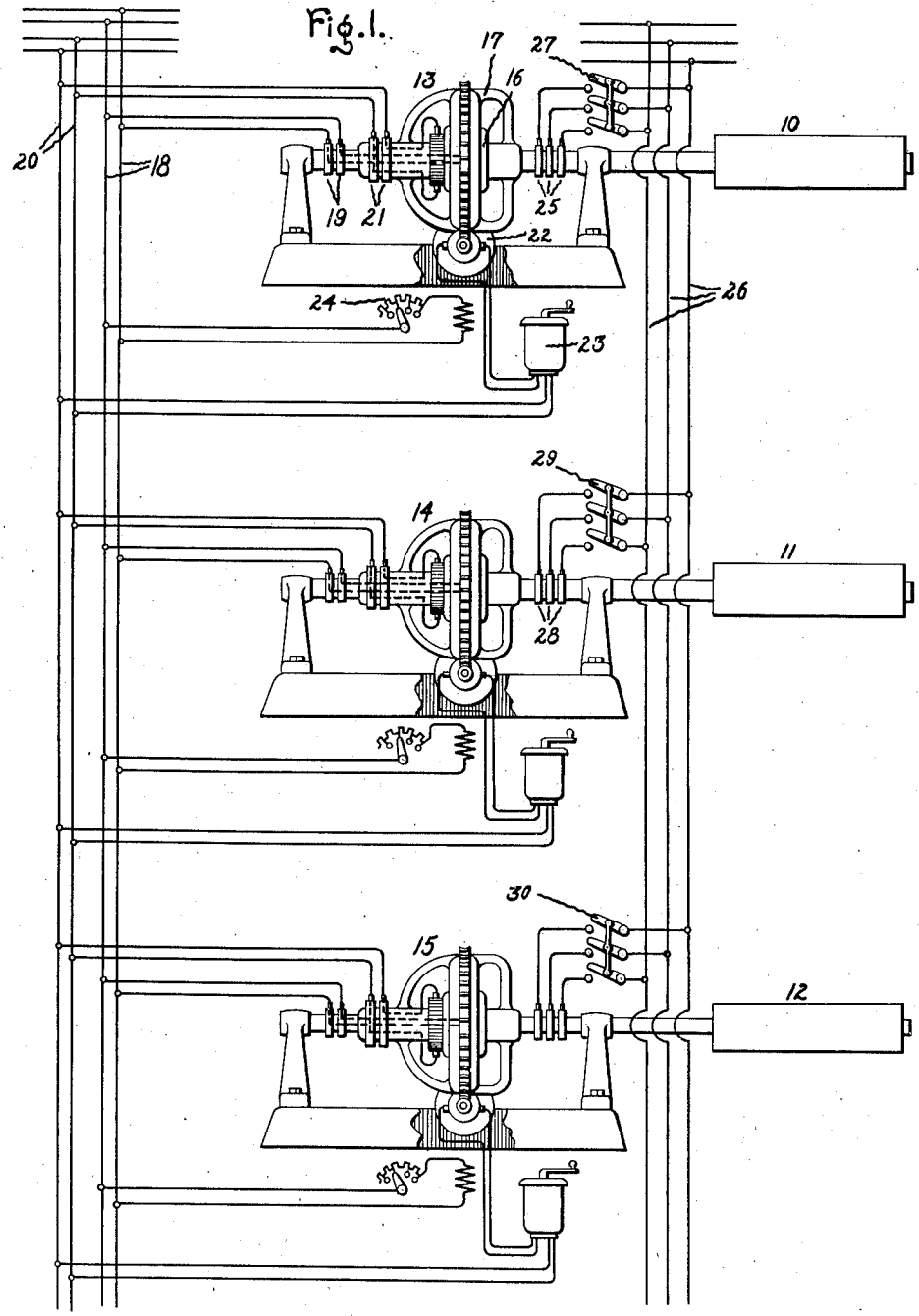

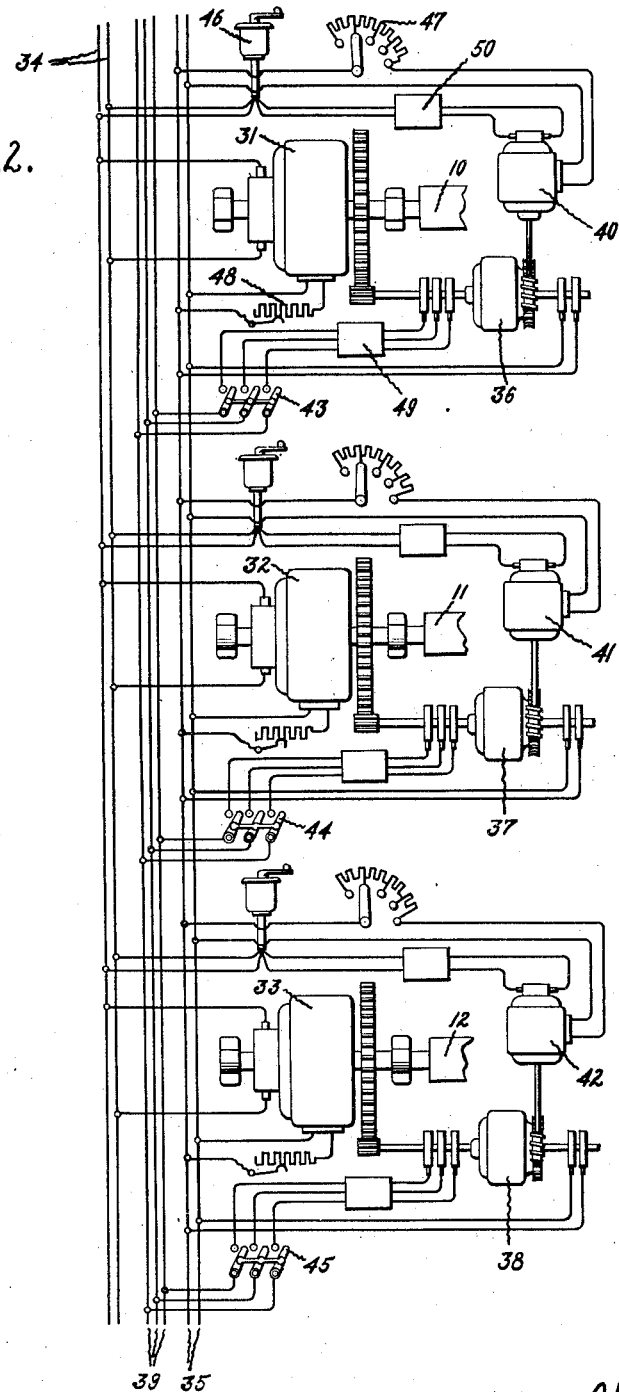

Patented Aug. 14, 1923.

1,465,087

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

SEGREGATED DRIVE FOR PAPER-MAKING MACHINES AND THE LIKE.

Application filed July 12, 1922. Serial No. 574,574.

*To all whom it may concern:*

Be it known that I, WILBUR L. MERRILL, a citizen of the United States, residing at Schenectady, in the county of Schenectady, State of New York, have invented certain new and useful Improvements in Segregated Drives for Paper-Making Machines and the like, of which the following is a specification.

My invention relates to improvements in arrangements for establishing and automatically maintaining a desired speed relation of the separate driving motors for the separate units of a machine, such as a paper-making machine or the like.

One of the objects of the invention is the provision of a simple and effective arrangement in which the speed of each of the separate driving motors of the machine may be independently adjusted while the machines are operating and the adjustment thus established be automatically maintained by means of electrical synchronizing connections between the driving motors.

A further object of the invention is the elimination of the automatically operated rheostats, speed cones and other complications of former drives of this nature.

A still further object of the invention is to provide a simple and effective arrangement for adjusting the "draw" between the units of the machine.

In carrying my invention into effect in one form, I provide a motor having rotatable field and armature elements for driving each of the various units of the machine. Synchronizing electrical connections between the driving motors are provided for automatically maintaining a predetermined speed relation of the motors. In the particular embodiment of my invention which I have selected for purposes of illustration, and as shown in Figure 1, the synchronizing connections take the form of a tie-in bus supplied with alternating current from the driving motors which serves to automatically maintain the predetermined speed relation of the motors by an interchange of power between the motors, depending on whether a particular motor tends to run faster or slower than the predetermined relation with the driving motors, but the invention is not necessarily limited to this type of synchronizing connections. In order to adjust the "draw" between the various units of the machine, the fields of the motors are rotated at various speeds depending on whether the speed of the particular unit is to be increased or decreased. Rotating the field of the motor will vary the motor speed, but the frequency of the current supplied to or taken from the synchronizing connections will not be altered, since the relative rotation of the field and armature members of the motor will remain at the predetermined value. The speed relation of the various driving motors may thus be varied at will by varying the speed of rotation of the field members, and the speed relation will then be automatically maintained through the synchronizing connections.

In another form of the invention as shown in Figure 2, instead of obtaining the adjustment for the "draw" by rotating the field member of the separate driving motor for a unit of the machine, the main driving motor may be of the ordinary form in which only one member is rotatable. In this form of the invention, an auxiliary driving motor is also mechanically connected to the unit to be driven and the speed of this auxiliary motor is varied by rotating its field frame member with respect to its armature. The predetermined speed relation thus established is automatically maintained through synchronizing connections. This arrangement has among other advantages, the advantages that there is less angular displacement in the driven machine for a given change in load, and that the main driving motor for the separate unit of the machine may be a standard motor.

In the accompanying drawings, Figure 1 illustrates an embodiment of the first form of my invention and Figure 2 illustrates an embodiment of the second form of my invention, above referred to.

Referring to Figure 1, the separate units 10, 11 and 12 of the paper-making or other driven machine are arranged to be driven by the electric motors 13, 14 and 15 respectively. Inasmuch as these motors, the connections of the motors and the arrangement for controlling the motors are the same, a description of the arrangement for driving one of the units of the machine will suffice for an understanding of the general arrangement. The electric motors 13, 14 and 15 are shown as of the direct current type, although the invention is not necessarily limited to direct current motors. The motor 13 comprises an armature member 16 which is arranged to be connected to the machine unit 10, and the field member 17 of the motor is also mounted so as to be rotatable. The field of the motor is supplied with current from the supply bus 18 through the collector rings 19, and the armature of the motor is supplied through the bus 20 through the collector rings 21. The controlling motor 22 is provided for rotating the field member 17 so as to thereby adjust the speed of the driving motor 13. This controlling motor 22 is arranged to be operated in the forward and reverse directions by means of the controller 23, and the speed of the motor is arranged to be varied by means of the shunt field rheostat 24. It will be obvious to those skilled in the art that other means for varying the speed of the controlling motor may be provided, if desired.

Leads are taken off from the armature 16 of the driving motor 13 and connected to the slip rings 25. These slip rings are connected to synchronizing connections 26 between the driving motors, and it will be understood that the current supplied or taken from the synchronizing connection 26 is alternating in character. The driving motors 13, 14 and 15 will be started from the supply busses 18 and 20 in any suitable manner, and I have not indicated any starting arrangements, since those skilled in the art will readily supply the same. Assume that it is desired to drive the units 10, 11 and 12 of the machine and to establish and automatically maintain a predetermined speed relation between the various driving motors. The various driving motors 13, 14 and 15 will be started in any preferred manner and brought up to somewhere near the desired speed of operation. When the switch 27 is closed, alternating current will be supplied from the armature of the driving motor 13 to the synchronizing connection 26. The speed of driving motor 14 may then be varied in any suitable manner so that the slip rings 28 of this motor may be connected to the synchronizing connections 26. The switch 29 will then be closed when the proper synchronizing relation has been established, and the two driving motors 13 and 14 will then be electrically connected through the synchronizing connections so as to automatically maintain their speed relation. The driving motor 15 may then be started and brought up to the proper synchronous speed with respect to the other two driving motors and the switch 30 closed, thus establishing a synchronous relation between the various driving motors. The synchronizing connections between the driving motor armatures will cause these machines to operate somewhat as synchronous motors in that they will be held together electrically so as to automatically maintain their proper relative speeds.

Assume now that the speed of the driving motor 13 is greater or less than the desired value, and that it is desired to change the speed of this motor with respect to the other driving motors so as to adjust for the draw between the sections of the machine driven by the motors. The motor 22 will be energized to rotate the field member 17 in the proper direction, and the field rheostat 24 will be adjusted so that the speed of the controlling motor 22, and thus the speed of operation of the field frame, will be such as to give the desired speed of operation of the machine unit 10. The frequency of the current taken from the armature of the driving motor 13 will not be altered because of the fact that a rotation of the field frame member 17 will produce a corresponding variation in the speed of the armature, and the relative speed of the armature member and the field member will remain the same as before. This is a valuable feature of the invention in that the speed relation of the various driving motors may be adjusted while the driving machines are operating and the speed relation of the motors will be automatically maintained through the synchronous tie-in bus 26. It will be understood that in order to vary the speed of the driving motors 14 and 15 with respect to each other and with respect to the driving motor 13, the controlling motors for rotating the field frame members of the driving motors will be rotated in such a direction and at such a speed as to give the proper speed relation.

In the arrangement of Fig. 2, which at the present time I regard as the preferred form of my invention, the main electric driving motors 31, 32 and 33 are arranged to be connected to the separate machine units 10, 11 and 12. These main electric driving motors are preferably of the direct current type having their armatures energized from the supply bus 34 and their field coils energized from the excitation bus 35. The auxiliary regulating motors 36, 37 and 38 are of the type having rotatable field and armature members. The armatures or rotors of these motors are arranged to be connected through slip rings to the alternating current tie-in bus synchronizing connections 39 and the field members of the regulating motors are connected so as to be excited from the excitation bus 35. The regulating motors are mechanically connected to the machine units 10, 11 and 12 by the pinion and gear arrangements shown. The speed relation of the various machine units is adjusted by adjusting the direction of rotation and speed of the field frame members of the regulating motors and for this purpose I have provided the separate variable speed reversible direct current electric controlling motors 40, 41 and 42. The rotating elements of these controlling motors are mechanically connected to the field frame members of the regulating motors by means of the worm and gear drive shown.

As thus constructed and arranged, the operation of this form of my invention is as follows:

The main electric motors 31, 32 and 33 will be first started and brought up to somewhere near the speed relation desired for the various machine units. Disconnecting switches 43, 44 and 45 will then be closed so as to connect the armatures of the regulating motors to the synchronizing tie-in bus 39 so as to thereby automatically maintain the speed relation of the main driving motors and the respective machine units driven thereby. In case it is desired to adjust the speed of the machine unit 10, so as to establish a new speed relation between the machine units, the controller 46 will be operated to connect the armature of the controlling motor 40 to the supply bus 34 for the proper direction of operation and the field rheostat 47 will be adjusted so as to obtain the proper speed of the controlling motor 40. The field frame member of the regulating motor 36 is thus rotated in the proper direction and at the proper speed so as to either increase or decrease the speed of the machine unit 10 to the desired speed. If the regulating motor 36 is controlled so as to increase the speed of the machine unit 10, this motor will operate as a motor, but in case it is controlled so as to decrease the speed of the machine unit 10, the regulating motor will operate as a generator, being driven by the main driving motor 31. After the speed of the machine unit 10 has thus been adjusted to the desired relation with the other machine units, the field rheostat 48 of the main motor 31 may be adjusted so as to vary the excitation of the main driving motor to reduce the load on the regulating motor 36. The speed relation thus determined will be automatically maintained through the synchronizing tie-in bus 39. The indicating wattmeters 49 and 50 are provided for giving a visible indication of the fact that the field rheostat 48 has been adjusted so that the loads on the regulating motor 36 and the controlling motor 40 have been properly reduced. The speeds of the machine units 11 and 12 may be adjusted in a similar manner so as to establish a new speed relation. It is believed that with the explanation above given in connection with the adjustment of the speed of machine unit 10, those skilled in the art will not need further explanation of the manner in which the speed relation of the machine units may be adjusted at will.

One of the advantages of the arrangement as shown in Fig. 2 is that main driving motors 31, 32 and 33 may be standard machines. Since these main driving motors are frequently of large size, this is an advantage in that the cost of the entire equipment may be reduced. The regulating motors 36, 37 and 38 will not be "standard machines" in the sense that the field frame members of these motors are constructed so as to be rotatable as well as the rotor or armature members of the motors, but because of the fact that a relatively small amount of power is transmitted through these motors, the cost of this special construction is relatively small. Another advantage of the arrangement as shown in Fig. 2 is that there will be less angular displacement in the driven machine units for a given change in load than in the cost of the arrangement as shown in Fig. 1.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:

1. A segregated drive for paper-making machines and the like, comprising separate electric motors for separate units of the machine, each of said motors having rotatable field armature members, one of the said members arranged to be connected to a machine unit, synchronizing electrical connections between similar members of the motors for automatically maintaining a predetermined speed relation of the motors, and means for rotating the other of the said members of the motors to adjust the speed relation of the motors to be automatically maintained.

2. A segregated drive for paper-making machines and the like, comprising separate electric motors for separate units of the machine, each of said motors having rotatable field and armature members, one of the said members arranged to be connected to a machine unit, synchronizing electrical connections between similar members of the motors for automatically maintaining a predetermined speed relation of the motors, and means for varying the relative speed of the other members of the motors to adjust the speed relation of the motors to be automatically maintained.

3. A segregated drive for paper-making machines and the like, comprising separate electric motors for separate units of the machine, each of the said motors having rotatable field and armature members, one of said members arranged to be connected with a unit of the machine, synchronizing electrical connections between similar members of the motors for automatically maintaining a predetermined speed relation of the motors, means for rotating the other members of the motors, and means for varying the relative speed of rotation of the said other members to vary the relative speed of the machine units to be automatically maintained.

4. A segregated drive for paper-making machines and the like, comprising separate electric motors for separate units of the machine, each of the said motors having rotatable field and armature members, one of said members arranged to be connected with a unit of the machine, synchronizing electrical connections between similar members of the motors for automatically maintaining a predetermined speed relation of the motors, a separate controlling motor for each of said motors for rotating the other member of the motor, and means for independently varying the speeds of the said controlling motors to establish a predetermined speed relation of the said driving motors to be automatically maintained.

5. A segregated drive for paper-making machines and the like, comprising separate direct current electric motors for separate units of the said machines, each of the said motors having rotatable field and armature members with the armature members arranged to be connected with a unit of the machine, synchronizing connections comprising a tie-in bus supplied with alternating current from the armatures of said motors for automatically maintaining a predetermined speed relation of the motors, a separate controlling motor for each of the said driving motors for rotating the field member of the driving motor, and speed varying means for the said controlling motors for establishing a speed relation of the said driving motors to be automatically maintained.

6. A segregated drive for paper-making machines and the like, comprising separate electric main motors for separate units of the machine, separate regulating motors arranged to be connected to the separate machine units, each of the said regulating motors having rotatable field and armature members, one of the said members connected to a machine unit, synchronizing electrical connections between similar members of the regulating motors for automatically maintaining a predetermined speed relation of the machine units, and means for rotating the other of the said members of the regulating motors to adjust the speed relation of the machine units.

7. A segregated drive for paper-making machines and the like, comprising separate electric main motors for separate units of the machine, separate regulating motors arranged to be connected to the separate machine units, each of the said regulating motors having rotatable field and armature members, one of the said members connected to a machine unit, synchronizing electrical connections between similar members of the regulating motors for automatically maintaining a predetermined speed relation of the machine units, means for rotating the other of the said members of the regulating motors to adjust the speed relation of the machine units, and means for varying the energization of the said main motors to reduce the load on the said regulating motors after the speed relation of the machine units has been adjusted.

8. A segregated drive for paper-making machines and the like, comprising separate direct current electric main motors for separate units of the machine, separate regulating motors connected to the separate machine units, each of the said regulating motors having rotatable field and armature members with one of the members connected to a machine unit, synchronizing electrical connections between similar members of the regulating motors for automatically maintaining a predetermined speed relation of the machine units, separate variable speed motors for rotating the other of the said members of the regulating motors to adjust the speed relation of the machine units, and means for varying the field excitation of the the said main motors to reduce the load on the said regulating motors after the speed relation of the machine units has been adjusted.

In witness whereof, I have hereunto set my hand this 11th day of July, 1922.

WILBUR L. MERRILL.